United States Patent [19]
Oota et al.

[11] 4,441,016
[45] Apr. 3, 1984

[54] ELECTRIC RICE COOKER

[75] Inventors: Hiroyuki Oota, Iwakura; Terutaka Aoshima, Toyohashi; Kenji Yamamori; Ryuho Narita, both of Nagoya, all of Japan

[73] Assignee: Tokyo Shibaura Denki Kabushiki Kaisha, Kawasaki, Japan

[21] Appl. No.: 461,494

[22] Filed: Jan. 27, 1983

[30] Foreign Application Priority Data

Jan. 30, 1982 [JP] Japan .................................. 57-14559

[51] Int. Cl.³ ............................................. F27D 11/02
[52] U.S. Cl. ..................................... 219/441; 99/333;
219/435; 219/442; 219/492; 219/494
[58] Field of Search ............... 219/429, 430, 433, 438,
219/439, 441, 442, 435, 492, 493, 494, 509, 510,
521; 99/332, 333

[56] References Cited

U.S. PATENT DOCUMENTS

| | | | |
|---|---|---|---|
| 2,952,764 | 9/1960 | Minami | 219/441 X |
| 4,313,051 | 1/1982 | Aoshima | 219/441 |
| 4,315,138 | 2/1982 | Miwa | 219/441 |
| 4,315,139 | 2/1982 | Onishi et al. | 219/441 |
| 4,362,923 | 12/1982 | Aoshima | 219/441 |

FOREIGN PATENT DOCUMENTS 5645434  9/1978  Japan .
5691527 12/1979  Japan .

Primary Examiner—Volodymyr Y. Mayewsky
Attorney, Agent, or Firm—Cushman, Darby & Cushman

[57] ABSTRACT

An electric rice cooker is disclosed which performs auxiliary cooking such as "twice cooking" by changing the operating time of auxiliary cooking in accordance with the actual cooking amount, immediately after the main cooking is completed. The actual temperature of a kettle which contains rice and water and which is detachably mounted in a thermal insulating frame is measured by a thermistor. Upon deenergization of an electric heater after main cooking is completed, the actual kettle temperature decreases. A time interval for the kettle temperature to go from a first temperature at the completion of main cooking to a second temperature is closely related to the actual cooking amount. The auxiliary cooking time interval is determined by a control circuit arranged in a case in accordance with the time interval described above.

11 Claims, 3 Drawing Figures

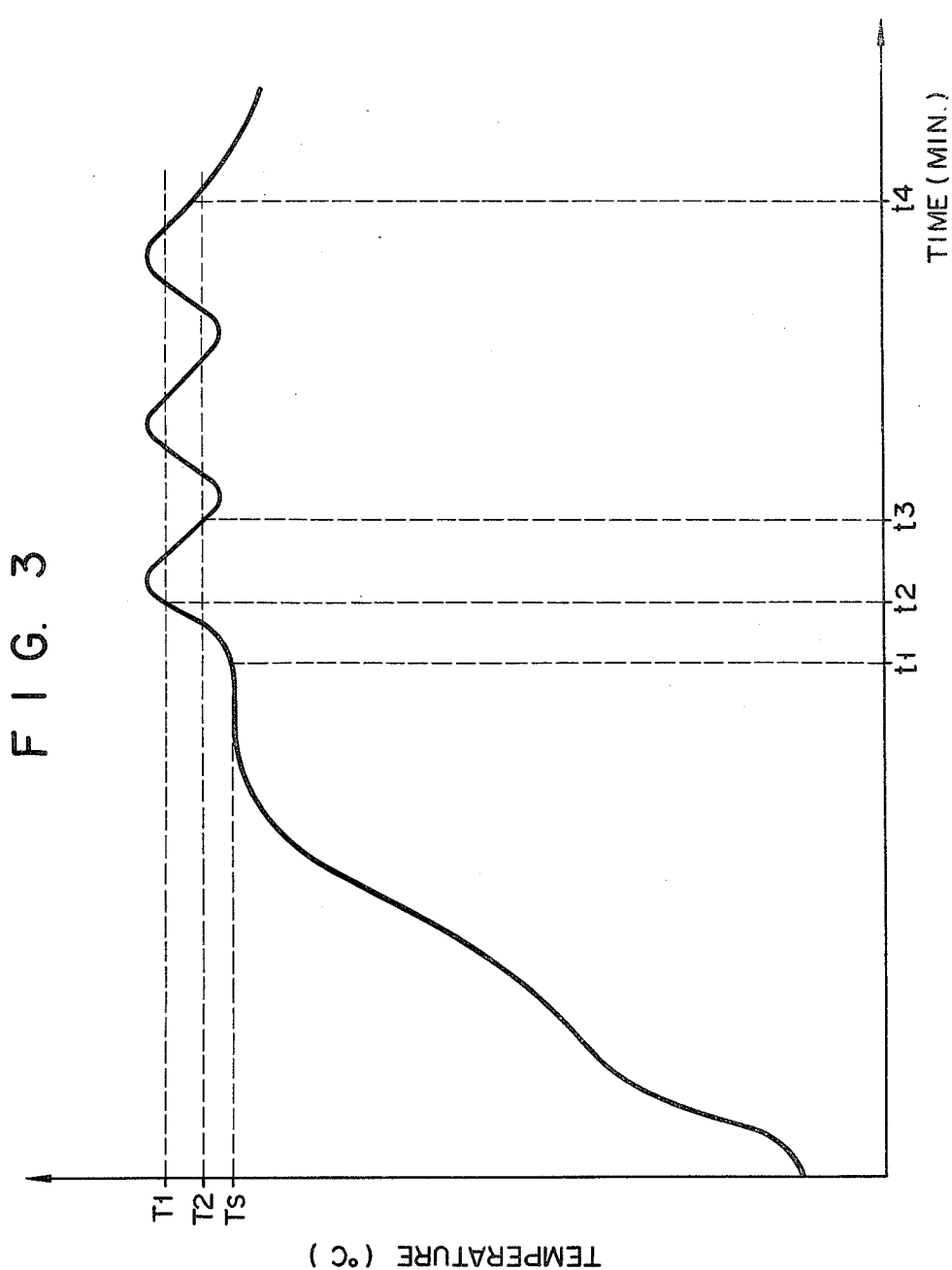

ELECTRIC RICE COOKER

BACKGROUND OF THE INVENTION

The present invention relates to an electric rice cooker and, more particularly, to an electric rice cooker for properly performing auxiliary cooking such as secondary cooking (referred to as a "twice cooking" hereinafter) and/or steaming (ripening) so as to effectively convert beta-starch to alpha-starch after the first cooking (main cooking) of rice and water contained in a cooking pot or kettle is completed.

A technique is already known among those who are skilled in the art in which auxiliary cooking in the "twice cooking" mode is performed to reheat the cooked rice in the cooking kettle, thereby effectively converting beta-starch to alpha-starch and evaporating excessive moisture to cook tasty rice. However, in auxiliary cooking in the "twice cooking" mode, the start time and the operating period of the heater are solely determined by a timer circuit or the like independent of the actual temperature conditions of the cooking kettle. Therefore, when the user wishes to cook a small amount of rice, the bottom portion of the rice gets browned. And, when the user wishes to cook a large amount of rice, beta-starch cannot be sufficiently converted to alpha-starch. As a result, it is very difficult to control the heater in the auxiliary cooking operation of the "twice cooking" mode in accordance with the actual amount of rice and water.

SUMMARY OF THE INVENTION

It is, therefore, an object of the present invention to provide a new and improved electric rice cooker for properly performing auxiliary cooking to effectively convert beta-starch to alpha-starch in every cooking operation in accordance with the actual amount to be cooked.

According to the electric rice cooker of the present nvention, auxiliary cooking is performed to convert beta-starch to alpha-starch immediately after the main cooking is completed. Auxiliary cooking includes "twice cooking". In this invention the ON time of the heater for auxiliary cooking is changed in every cooking operation in accordance with the actual amount of rice and water. The actual cooking amount is electrically detected in accordance with data of a time interval required for the actual kettle temperature to decrease to a predetermined reference temperature after the cooking heater is deenergized upon completion of main cooking. The time data of the timer which properly corresponds to the detected kettle temperature is selected as the reference time data of currently performed cooking among a plurality of pieces of time data. Heating is interrupted when the time interval of auxiliary cooking is equal to the reference time preset in the timer. Therefore, auxiliary cooking is performed during a time period defined above, thereby properly converting beta-starch to alpha-starch and cooking a desired amount of tasty rice.

BRIEF DESCRIPTION OF THE DRAWINGS

The present invention is best understood by reference to the accompanying drawings, in which:

FIG. 3 is a graph for explaining the change in the actual kettle temperature (°C.), as a function of time (min), of the cooking kettle housed in the electric rice cooker of FIG. 1.

DETAILED DESCRIPTION OF THE PREFERRED EMBODIMENT

Figure 1:
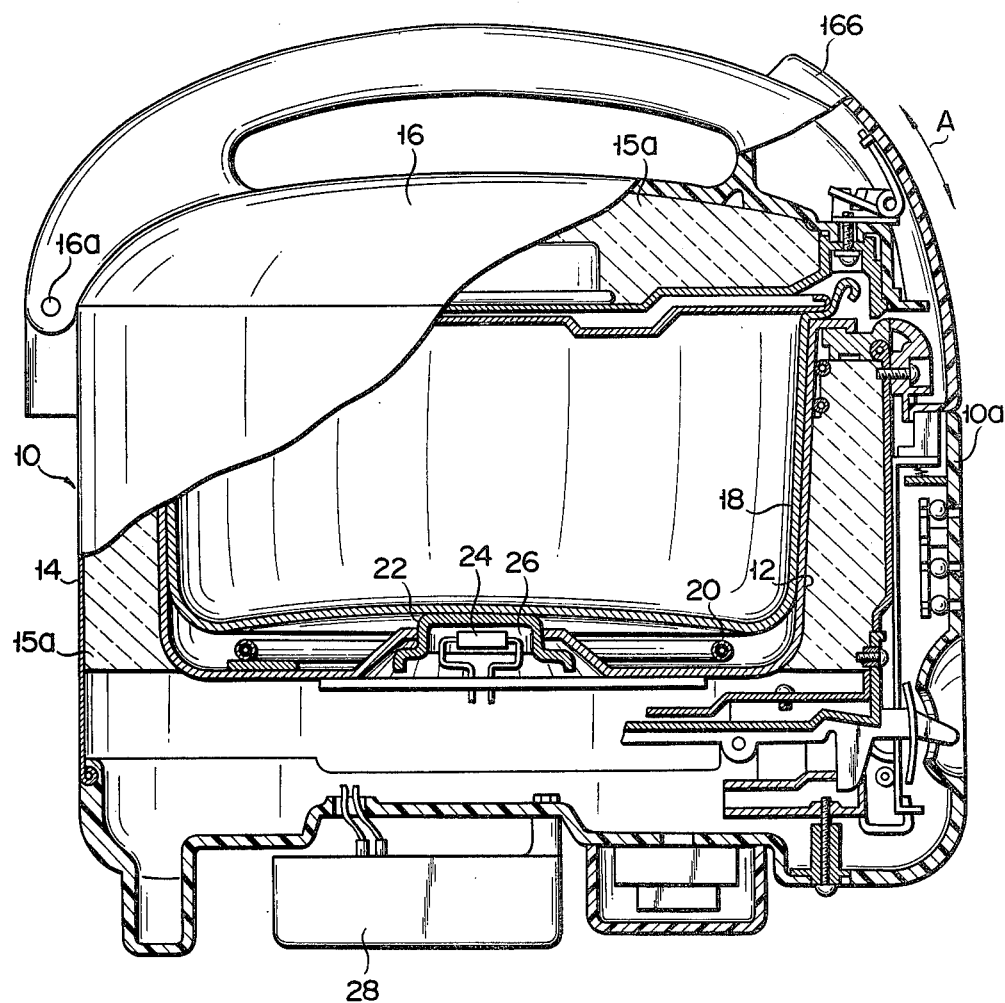
FIG. 1 is a partially cutaway side view showing the internal structure of an electric rice cooker according to an embodiment of the present invention.

Referring now to FIG. 1, there is illustrated an electric rice cooker in accordance with one preferred embodiment of the present invention. In FIG. 1, a main body 10 includes an inner case 12 and an outer case 14. A thermal insulating material 15a is sandwiched between the inner and outer cases 12 and 14. A lid member 16 has a thermal insulating material 15b therein. The lid member 16 is mounted at an upper opening (not shown) of the main body 10 to be pivotal or swingable in the direction indicated by arrow A about a hinge shaft 16a. When the lid member 16 is tightly closed, an engaging member 16b which is disposed opposing the hinge shaft 16a of the main body 10 tightly closes the main body 10. The internal space of the main body 10 is thus thermally insulated from the outer atmosphere.

A desired amount of rice (not shown) to be cooked and a suitable amount of water (not shown) for cooking it are contained in a cooking pot or kettle 18 housed in the inner case 12 of the main body 10. A heater 20 is provided on the inner surface of the bottom of the inner case 12 to heat the kettle 18 detachably mounted in the inner case 12. When the kettle 18 with rice and water contained therein is mounted in the main body 10, the heater 20 comes closer to the outer bottom surface of the kettle 18. Therefore, the heater 20 can directly heat the kettle 18 with rice and water contained therein.

A cup-shaped heat sensor 22 is disposed at substantially the center of the inner bottom surface of the inner case 12 so as to be brought into tight and elastic contact with the outer bottom surface of the kettle 18 placed in the inner case 12. The heat sensor 22 has a thermistor 24 which serves as a temperature sensing element therein. The thermistor 24 is stably encapsulated within a molded member 26 which comprises a good heat-conductive material. The actual temperature of the kettle 18 is detected by the heat sensor 22. The thermistor 24 changes its resistance in accordance with the detected temperature. A case 28 is disposed at the outer bottom portion of the outer case 14 of the main body 10 and has a cooking control section.

Figure 2:
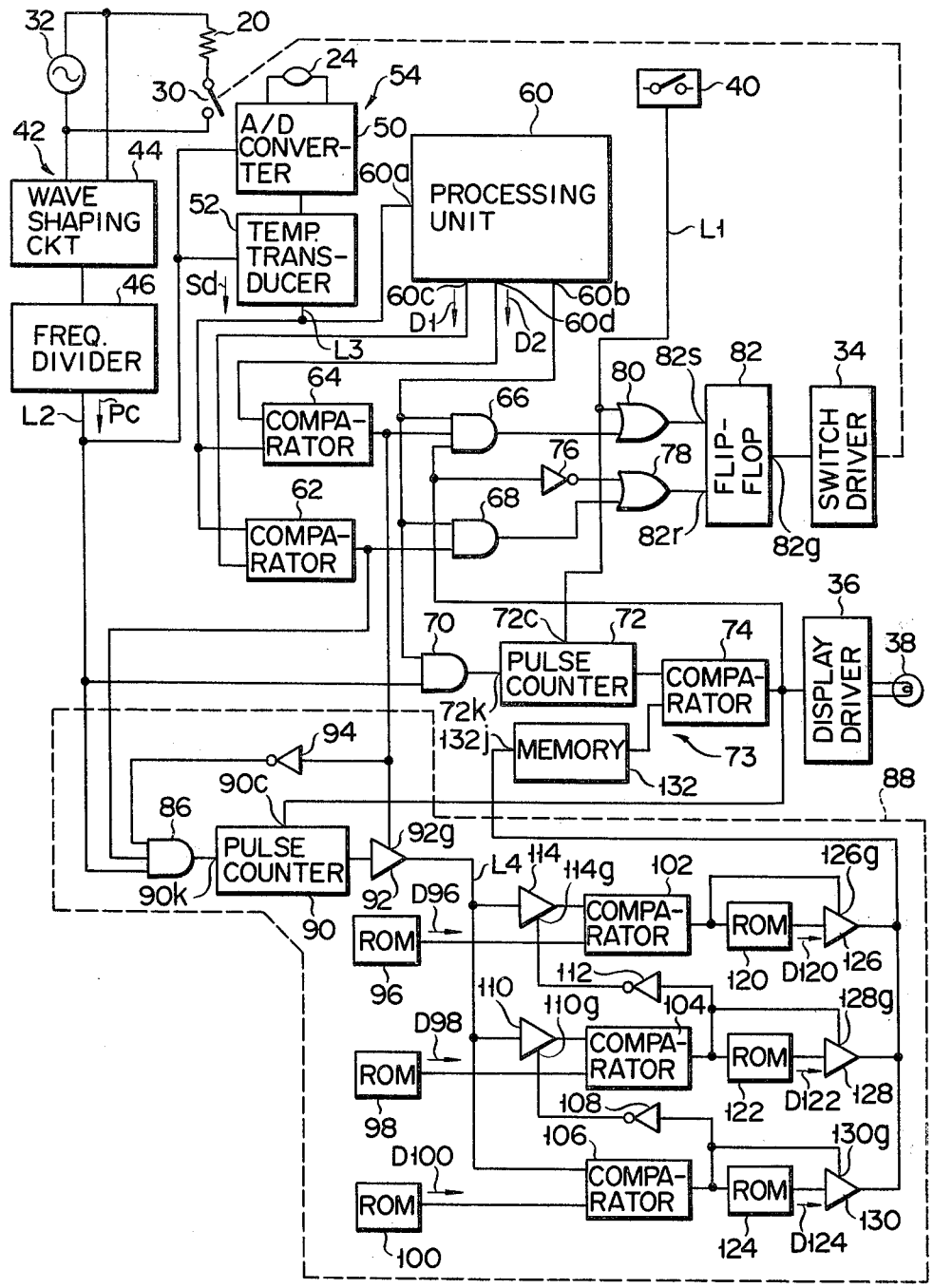
FIG. 2 is a circuit diagram showing the overall configuration of the electric rice cooker of FIG. 1.

The cooking control section arranged in the case 28 is shown in detail in FIG. 2. The heater 20 is electrically connected to a home AC power source 32 through a normally open switch 30 via a known connecting means (not shown) such as a cord and plug. The normally open switch (to be referred to as a "heater switch" hereinafter) 30 is turned on by a switch driver 34 only when the switch driver 34 receives a signal of logic level "1" (logic level "1" signal). Reference numeral 36 denotes a display driver for driving a cooking indicator lamp 38 only when the display driver 36 receives a logic level "1" signal. A switch to be manually operated by the user functions as a cooking start switch 40 (to be referred to as a "cooking switch" hereinafter). When the user presses the cooking switch 40, it produces a logic level "1" signal. This signal is supplied onto a signal line L1.

Both terminals of the AC power source 32 are connected to a clock pulse generator 42 which includes a wave-shaping circuit 44 and a frequency divider 46. The wave-shaping circuit 44 shapes the waveform of the output from the AC power source 32. The frequency divider 46 is connected to the wave shaping circuit 44 to frequency-divide its output. The frequency divider 46 is arranged to produce a clock pulse signal Pc of, for example, 1-Hz frequency in a known manner, which is then supplied onto a signal line L2. The clock pulse signal Pc is simultaneously supplied to an A/D converter 50 connected to the thermistor 24, and to a temperature transducer 52 connected to the A/D converter 50. The A/D converter 50 receives, as an input signal, an analog change in resistance of the thermistor 24. Every time the A/D converter 50 further receives the clock pulse signal Pc from the clock pulse generator 42, it converts the analog resistance value into a digital resistance value. The temperature transducer 52 receives the output from the A/D converter 50 and transduces it into a digital temperature value. The temperature transducer 52 then supplies a digitized temperature detection signal Sd which corresponds to the actual kettle temperature Td onto a signal line L3. The thermistor 24, the A/D converter 50 and the temperature transducer 52 constitute a kettle temperature measuring circuit 54.

The temperature detection signal Sd is supplied to an input terminal 60a of a processing unit 60. The processing unit 60 performs an arithmetic operation and detects that the actual kettle temperature Td represented by the temperature detection signal Sd has reached a predetermined value (corresponding to the boiling temperature of water in the cooking kettle 18) and is increased again. An output terminal 60b of the processing unit 60 then becomes high. At the same time, the processing unit 60 is arranged to produce a data signal D1 representing a cooking completion or "cooked" temperature T1 (corresponding to a temperature, e.g., 115° C.) and a data signal D2 representing a predetermined auxiliary cooking start temperature T2 (corresponding to a temperature, e.g., 105° C.) in the "twice cooking" mode from data output terminals 60c and 60d thereof (where T1>T2, and T1>115° C.). The data signal D1 is supplied to one input terminal of a comparator 62. The temperature detection signal Sd is supplied to the other input terminal of the comparator 62. The comparator 62 compares the actual kettle temperature Ts represented by the temperature detection signal Sd and the temperature T1 represented by the data signal D1. When the temperature Ts is equal to or higher than the temperature T1, the comparator 62 produces a logic level "1" signal. Otherwise, the comparator 62 produces a logic level "0" signal. The data signal D2 is supplied to one input terminal of a comparator 64. The temperature detection signal Sd is supplied to the other input terminal of the comparator 64. The comparator 64 compares the actual kettle temperature Ts and the temperature T2 represented by the data signal D2. When the temperature Ts is equal to or lower than the temperature T2, the comparator 64 produces a signal of logic level "1". Otherwise, it produces a signal of logic level "0".

The output terminal 60b of the processing unit 60 is connected to the first input terminals of a 3-input AND gate 66, and AND gates 68 and 70. The second input terminal of the 3-input AND gate 66 is connected to the output terminal of the comparator 64. The output terminal of the comparator 62 is connected to the second input terminal of the AND gate 68. The second input terminal of the AND gate 70 is connected to the signal line L2 connected to the frequency divider 46. The output terminal of the AND gate 70 is connected to a clock input terminal 72K of a pulse counter 72 included in a timer circuit 73. A clear terminal 72c of the pulse counter 72 is connected to the signal line L1 which is connected to the cooking switch 40. The pulse counter 72 counts clock pulses received at the clock input terminal 72K thereof. Furthermore, when the pulse counter 72 receives a logic level "1" signal at the clear terminal 72c thereof, the count of the pulse counter 72 is cleared. The output terminal of the pulse counter 72 is connected to the first input terminal of a comparator 74. The output terminal of the comparator 74 is connected to one input terminal of an OR gate 78 through an inverter 76, to a display driver 36, and to the third input terminal of the 3-input AND gate 66. The OR gate 78 has the other input terminal connected to the output terminal of the AND gate 68. The output terminal of the 3-input AND gate 66 is connected to one input terminal of an OR gate 80 which has the other input terminal connected to the cooking switch 40. The outputs of the OR gates 80 and 78 are respectively connected to a set terminal 82s and a reset terminal 82r of an R-S flip-flop 82. An output terminal 82q of the R-S flip-flop 82 is connected to the switch driver 34.

The clock pulse signal Pc is further supplied to the first input terminal of a 3-input AND gate 86 of a cooking amount measuring circuit 88. The output terminal of the 3-input AND gate 86 is connected to a clock input terminal 90k of a pulse counter 90. The pulse counter 90 has its clear terminal 90c connected to the output terminal of the comparator 74. The output terminal of the pulse counter 90 is connected to a signal line L4 through a transfer gate 92. It is noted that the 3-input AND gate 86 has the second input terminal connected to the output terminal of the comparator 62 and the third input terminal connected to a gate terminal 92g of a transfer gate 92 through an inverter 94. The gate terminal 92g of the transfer gate 92 is connected to the output terminal of the comparator 64.

The cooking amount measuring circuit 88 includes three data memories 96, 98 and 100 each comprising a ROM. The data memories 96, 98 and 100 store data signals D96, D98 and D100 of reference time intervals t96, t98 and t100 (t96=120 sec, t96=240 sec, and t100=360 sec), respectively. The data memories 96, 98 and 100 are respectively connected to the first input terminals of comparators 102, 104 and 106. The comparator 106 has the second input terminal which is directly connected to the signal line L4. The comparator 106 compares the count from the pulse counter 90 through the transfer gate 92 and the reference time interval t100 (i.e., 360 sec) represented by the data signal D100 read out from the data memory 100. When the count of the pulse counter 90 is equal to or greater than the reference time interval t100, the comparator 106 produces a logic level "1" signal. Otherwise, it produces a logic level "0" signal. The output terminal of the comparator 106 is connected to a gate terminal 110g of a transfer gate 110 through an inverter 108. The transfer gate 110 is connected between the signal line L4 and the second input terminal of the comparator 104. While the transfer gate 110 receives a logic level "1" signal at the gate terminal 110g thereof, it allows transmission of the count data from the pulse counter 90 therethrough so as to supply it to the comparator 104. When the comparator 104 receives the count data from the pulse counter 90, it compares the time interval represented by the count data and the reference tim interval t98 (=240 sec) represented by the data signal D98 read out from the data memory 98. When the time interval is equal to or longer than the time interval t98, the comparator 104 produces a logic level "1" signal. Otherwise, it produces a logic level "0" signal. The output terminal of the comparator 104 is connected to a gate terminal 114g of a transfer gate 114 through an inverter 112. The transfer gate 114 has the same function as the transfer gate 110. When the count data is supplied from the transfer gate 114 to the second terminal of the comparator 102, the comparator 102 compares the time interval represented by the count data and the reference time interval t96 (=120 sec) represented by the data signal D96 read out from the data memory 96. When the count data is equal to or longer than the reference time interval t96, the comparator 102 produces a logic level "1" signal. Otherwise, it produces a logic level "0" signal.

The output terminals of the comparators 102, 104 and 106 are respectively connected to transfer gates 126, 128 and 130 through data memories 120, 122 and 124 each comprising a ROM. The data memories 120, 122 and 124 respectively store time data signals D120, D122 and D124 of timer reference time intervals t120, t122 and t124 (e.g., t120=1,200 sec, t122=900 sec, and t124=600 sec). The output terminals of the comparators 102, 104 and 106 are directly connected to gate terminals 126g, 128g and 130g of the transfer gates 126, 128 and 130, respectively. While the transfer gates 126, 128 and 130 receive logic level "1" signals at their gate terminals, they allow the data signals D120, D122 and D124 from the data memories 120, 122 and 124 to pass therethrough. The output terminals of the transfer gates 126, 128 and 130 are commonly connected to the second input terminal of the comparator 74 through a timer data memory 132. The timer data memory 132 stores data of the time interval t120, t122 or t124, which is represented by the time data signal D120, D122 or D124 and received at its input terminal 132i, and does not update the content even if data is received which is greater than the stored data after the data storage is completed during a given cooking operation.

The mode of operation of the electric rice cooker according to an embodiment of the present invention will be described with reference to the graph showing a change in kettle temperature as a function of time in FIG. 3. A desired amount of rice and a suitable amount of water are contained in the kettle 18 shown in FIG. 1 and the lid member 16 is closed. In this condition, when the user presses the cooking switch 40, the cooking switch 40 supplies a logic level "1" signal onto the signal line L1. The pulse counter 72 is cleared in response to the logic level "1" signal. At the same time, since the logic level "1" signal is supplied to the R-S flip-flop 82 through the OR gate 80, the R-S flip-flop 82 is set so that its output terminal 82q produces a logic level "1" signal. In response to this signal, the switch driver 34 causes the heater switch 30 to turn on. Power is then supplied from the AC power source 32 to the heater 20. The heater 20 heats the kettle 18, thus initiating the cooking operation (main cooking).

When the pulse counter 72 is cleared, the timer data memory 132 stores time data of a time interval t120, t122 or t124 which was used in the immediately previous cooking operation. The count of the pulse counter 72 is smaller than the output from the timer data memory 122. The comparator 74 then supplies a logic level "1" signal to the display driver 36. The indicator lamp 38 is then driven by the display driver 36, so that the user can visually check the start of cooking operation by the indicator lamp 38.

Thereafter, the kettle temperature is increased over time upon heating of the heater 20, as shown in FIG. 3. The kettle temperature is measured by the kettle temperature measuring circuit 54, and the temperature detection signal Sd is produced by the temperature transducer 52 at a period of the clock pulse signal Pc, that is, at every one second.

When water in the kettle 18 is boiled upon heating of the heater 20, the kettle temperature reaches the temperature Ts, and its temperature gradient becomes temporarily flat. When the kettle temperature is abruptly increased from time t1, the processing unit 60 detects this change in kettle temperature. The processing unit 60 then produces a logic level "1" from its output terminal 60b. At the same time, the processing unit 60 produces the data signal D1 indicating the "cooked" temperature T1 and the data signal D2 indicating the start temperature T2 of auxiliary cooking in the "twice cooking" mode. The logic level "1" signal from the processing unit 60 is supplied to the AND gates 66, 68 and 70. In response to this signal, the AND gate 70 allows the clock pulse signal Pc to pass therethrough, thereby supplying the clock pulse signal Pc to the clock input terminal 72k of the pulse counter 72. Thus, the pulse counter 72 starts counting the clock pulses and the timer circuit 73 begins operating.

Meanwhile, the "cooked" temperature T1 represented by the data signal D1 from the processing unit 60 is compared with the temperature detection signal Sd by the comparator 62. When the actual kettle temperature Td increased by the heater 20 becomes equal to or higher than the "cooked" temperature T1, the comparator 62 produces a logic level "1" signal which is then supplied to the AND gate 68. At the same time, the AND gate 68 receives a logic level "1" signal from the processing unit 60. As a result, the AND gate 68 produces a logic level "1" signal. This signal is supplied to the reset input terminal 82r of the R-S flip-flop 82 through the OR gate 78, thereby resetting the R-S flip-flop 82. The logic level "1" signal is not supplied to the switch driver 34 any longer, so that the heater switch 30 is turned off, and the heater 20 is then deenergized. Thereafter, steaming is performed a time interval which is controlled by the timer circuit 73.

After the heater 20 is deenergized, the actual kettle temperature is not abruptly decreased but is slightly increased by "after heat". At time t2 in FIG. 3, since the actual kettle temperature Td represented by the detection signal Sd is higher than the start temperature T2 whose data is produced from the output terminal 60d of the processing unit 60, the comparator 64 produces a logic level "0" signal. The logic level "0" signal is inverted to a logic level "1" signal by the inverter 94 and the inverted signal is then supplied to the third input terminal of the 3-input AND gate 86. The second input terminal of the 3-input AND gate 86 receives the logic level "1" signal from the comparator 62. The 3-input AND gate 86 transfers the clock pulse signal Pc from the pulse generator 42 to the clock input terminal 90k of the pulse counter 90. Therefore, the pulse counter 90 is started at time t2.

A change in the kettle temperature after deenergization of the heater 20 is inversely proportional to the actual cooking amount. The actual kettle temperature is temporarily increased by an effect of "after heat" and reaches the maximum peak value. The actual kettle temperature is then decreased. The time interval tc (=t2−t1) from the cooking completion temperature T1 to the auxiliary cooking start temperature T2 is increased when the actual cooking amount is increased. Conversely, the time interval tc is decreased when the actual cooking amount is decreased. The cooking amount measuring circuit 88 detects the time interval tc to determine the actual cooking amount in accordance with the time interval tc.

To be more specific, at time t2 when the cooking heater 20 is deenergized and the pulse counter 90 starts for time measurement, the logic level "0" signal is supplied from the comparator 64 to the gate terminal 92g of the transfer gate 92. The count data of the pulse counter 90 may not pass through the transfer gate 92. Since the reference time interval indicated by the data signal D100 supplied from the data memory 100 to the first input terminal of the comparator 106 is longer than the value indicated by the input signal to the second input terminal thereof, the comparator 106 produces a logic level "0" signal. The logic level "0" signal is inverted by the inverter 108, so that the logic level "1" signal is supplied to the gate terminal 100g of the transfer gate 100 so as to open the transfer gate 110. In this condition, since the comparator 104 produces a logic level "0" signal, the transfer gate 114 is opened to allow transmission of the signal therethrough.

Thereafter, when the actual kettle temperature after deenergization of the cooking heater 20 becomes equal to the auxiliary cooking start temperature T2 at time t3, the comparator 64 generates a logic level "1" signal. The signal is inverted by the inverter 94, so that the logic level "0" signal is supplied to the 3-input AND gate 86. The clock pulse signal Pc is no longer supplied to the clock input terminal of the pulse counter 90, so that the pulse counter 90 stops operation. At the same time, the transfer gate 92 is opened in response to the logic level "1" signal from the comparator 64 so as to transmit the count data onto the signal line L4. The count data corresponds to the time interval tc (sec) from time t2 to time t3, that is, the change in kettle temperature. Since the transfer gates 110 and 114 are thus enabled, the count data of the pulse counter 90 is supplied to the first input terminals of the comparators 102, 104 and 106.

Firstly, when the count of the counter 90 corresponds to a range between 120 to 239 sec, that is, to a small cooking amount, the comparator 102 compares the count data of the pulse counter 90 and the reference time interval t96 indicated by the data signal D96 from the data memory 96. The comparator 102 then produces a logic level "1" signal. Meanwhile, the comparators 104 and 106 produce logic level "0" signals, respectively. Therefore, only the transfer gate 126 is opened, so that the data signal D120 (corresponding to 600 sec) stored in the data memory 120 is read out and stored in the memory 132.

Secondly, when the count of the counter 90 corresponds to a range between 240 to 359 sec, that is, to a medium cooking amount, the comparators 102 and 104 generate logic level "1" signals. The transfer gates 126 and 128 are then opened, so that data signals D120 and D122, which are respectively stored in the data memories 120 and 122, are supplied to the memory 132. The memory 132 stores, as the reference timer operating interval, the data signal D122 which indicates a time interval (=900 sec) longer than that of the other timer data.

Thirdly, when the count of the counter 90 corresponds to a value which exceeds 360 sec, that is, to a large cooking amount, the comparators 102, 104 and 106 produce logic level "1" signals. The data signals D120, D122 and D124, which are respectively stored in the data memories 120, 122 and 124, are supplied to the memory 132. The memory 132 stores the data signal D122 which indicates the longest time interval as the reference timer operating interval.

In any of the cases described above, proper timer operating time data corresponding to the actual cooking amount is automatically stored in the auxiliary cooking timer operating time data memory 132. Once the memory 132 stores the timer operating data for auxiliary cooking, it does not update the storage content even if time data, which is greater than the currently stored time data, is supplied. Therefore, even if the count of the pulse counter 90 is increased after time t3, the storage contents of the memory 132 will not be adversely influenced.

A case will be described in which a great amount of rice and water is contained in the kettle 18. In this case, data of the timer reference time interval t124 (=1,200 sec) is stored in the timer data memory 132. At time t2 at the "cooked" temperature, a signal of logic level "1" is produced from the output terminal 60b of the processing unit 60 and is supplied to the AND gate 70. Therefore, the clock pulse signal Pc is supplied to the pulse counter 72 through the AND gate 70, so that the pulse counter 72 starts counting the clock pulses.

The data signal D2, which indicates the temperature T2, is supplied from the output terminal 60d of the processing unit 60 to the comparator 64. When the kettle temperature, which is gradually decreased after the heater 20 is deenergized and the peak temperature of the kettle 18 is obtained, becomes equal to or lower than the temperature T2, the comparator 64 produces a logic level "1" signal. This logic level "1" signal is supplied to the second input terminal of the 3-input AND gate 66. At the same time, the logic level "1" signal from the output terminal 60b of the processing unit 60 is supplied to the first input terminal of the AND gate 66, while the signal, which is produced by the comparator 74 and is inverted as the signal of logic level "1" by the inverter 76, is supplied to the third input terminal thereof. Therefore, the 3-input AND gate 66 produces a logic level "1" signal. This signal is supplied to the set input terminal 82s of the R-S flip-flop 82 through the OR gate 80. As a result, the R-S flip-flop 82 is set again to supply the logic level "1" signal to the switch driver 34. The heater switch 30 is turned on, and the heater 20 is then energized, thereby reheating the kettle 18 a second time. Thereafter, when the actual kettle temperature increases upon heating of the heater 20 and reaches the cooking completion temperature T1, the heater 20 is deenergized again in the same manner as described above. When the kettle temperature is decreased and becomes equal to the temperature T2, the heater 20 is energized again. Such an operation is repeated. When the pulse counter 72 continues to count the clock pulses during the time interval t124 (=1,200 sec) from time t1 to time t4, the comparator 74 produces a logic level "0" signal. The logic level "0" signal is then inverted by the inverter 76 to a logic level "1" signal which is then supplied to the reset input terminal 82r of the R-S flip-flop 82 through the OR gate 78. As a result, the switch driver 34 is operated to turn off the heater switch 30. As a result, the heater 20 is deenergized. At the same time, the display driver 36 is operated to turn off the indicator lamp 38. As described above, ripening in auxiliary cooking of the "twice cooking" mode is performed to effectively convert beta-starch to alpha-starch.

In the electric rice cooker which is arranged and operated as described above, the actual cooking amount is electrically measured by the cooking amount measuring circuit 88 every time a cooking operation is performed. The measured cooking amount is classified as belonging to one of the cooking amount categories. The operating time of the timer circuit 73 is automatically elongated when a great amount of rice is cooked. During the operating time of the timer circuit 73, the heater 20 is repeatedly energized. However, the operating time of the timer circuit 73 is automatically shortened when a small amount of rice is cooked. The number of reheating operations of the heater 20 is properly decreased during auxiliary cooking in the "twice cooking" mode. Therefore, "twice cooking" including ripening can be properly performed to effectively convert beta-starch to alpha-starch under optimal conditions in accordance with the actual amount of rice and water. Cooking trouble such as burning of the cooked rice or insufficient conversion of beta-starch to alpha-starch can be completely prevented.

According to the embodiment described above, since the actual cooking amount is electrically detected, the detection is precise and reliable, thus eliminating variations in the characteristics of rice cookers and simplifying the circuit configuration thereof.

The actual cooking amount is determined in accordance with an increase in kettle temperature by "after heat" between time t2 and time t3 after the main cooking is performed. The increase in kettle temperature is one of the most important criteria for measuring the actual cooking amount. Therefore, according to the present invention, the actual amount of rice can always be properly and effectively measured.

The time interval, for which the count data of the counter 90 is supplied to the comparators 102 and 104, is properly controlled by the transfer gates 114 and 110 respectively arranged between the signal line L4 and the comparator 102 and between the signal line L3 and the comparator 104. Therefore, the logic level "1" signal will not be simultaneously produced by the comparators 102, 104 and 106 in accordance with comparison results of the count data and a set of time intervals t96, t98 and t100. Therefore, the transfer gates 126, 128 and/or 130 will not be simultaneously opened, thereby preventing simultaneous supply of the data signals D120, D122 and/or D124 to the timer data memory 132. In this manner, only one proper timer data in accordance with the actual cooking amount is supplied to the timer data memory 132, so that the circuit arrangement for the auxiliary cooking timer is simplified.

Although the present invention has been shown and described with respect to a particular embodiment, various changes and modifications which are obvious to a person skilled in the art are deemed to lie within the spirit, scope and contemplation of the invention.

What we claim is:

1. An electric rice cooking apparatus for performing main cooking and subsequent auxiliary cooking for effectively converting beta-starch to alpha-starch, comprising:
   (a) a cooking kettle for containing rice and water;
   (b) thermal insulating frame means for detachably placing said cooking kettle therein;
   (c) heater means disposed in said frame means, for receiving power and for electrically generating heat to heat said cooking kettle and contents thereof;
   (d) temperature detecting means for measuring the actual kettle temperature of said cooking kettle and for producing a detection signal corresponding to the actual kettle temperature;
   (e) first controlling means, connected to said temperature detecting means and said heater means, for storing first and second reference temperatures, for deenergizing said heater means to complete the main cooking at a proper time when the kettle temperature increased by heating by said heater means reaches the first reference temperature, and for energizing said heater means again to initiate the auxiliary cooking when the kettle temperature decreased by deenergization by said heater means reaches the second reference temperature;
   (f) auxiliary cooking operating time determinating means connected to said first controlling means, for electrically detecting the actual lapse time required for the actual kettle temperature to reach the second reference temperature after the main cooking is completed in every cooking operation, for determining a cooking amount in accordance with the time interval, and for producing a time data signal representing a reference timer operating interval corresponding to an auxiliary cooking operating time in accordance with the cooking amount; and
   (g) second controlling means, connected to said auxiliary cooking operating time determining means and said heater means, for measuring the actual lapse time of the auxiliary cooking, and for finally deenergizing said heater means independently of said first controlling means when the length of the actual lapse time is equal to said reference timer operating interval, thereby completing the auxiliary cooking operating time.

2. An apparatus according to claim 1, wherein said first controlling means intermittently energizes said heater means to perform the auxiliary cooking after said heater means is energized again, thereby substantially keeping the kettle temperature in a temperature range between the first and second reference temperatures.

3. An apparatus according to claim 1, wherein said auxiliary cooking operating time determining means stores a plurality of pieces of time interval data which sequentially increase in accordance with categories, selects one of said plurality of pieces of time interval data which corresponds to the actual time interval, and determines the actual cooking amount in accordance with the category of the selected one of said plurality of pieces of time interval data.

4. An apparatus according to claim 3, wherein said auxiliary cooking operating time determining means further stores a plurality of pieces of timer operating time data which sequentially increase in accordance with categories and in correspondence with said plurality of pieces of time interval data, selects one of said plurality of pieces of timer operating time data which corresponds to the selected time interval data, and produces as the reference timer operating time data the selected one of said plurality of pieces of timer operating time data.

5. An apparatus according to claim 1, wherein said auxiliary cooking operating time determining means comprises:

first circuit means connected to said first controlling means, for receiving a clock signal to start counting the clock signal when the kettle temperature increased by heating by said heater means reaches the first reference temperature and for measuring the actual lapse time when the kettle temperature decreased by deenergization by said heater means under control of said first controlling means reaches the second reference temperature;

second circuit means connected to said first circuit means, for storing a plurality of time values which are sequentially increased in a unit time value to provide a plurality of time regions consisting of a time region smaller than the minimum time value, a time region larger than the maximum time value and time regions determined among the time values, for detecting one of said time regions which includes the actual lapse time measured by said first circuit means, and for generating a cooking amount signal which corresponds to the detected time region and which indicates the actual cooking amount; and third circuit means connected to said second circuit means, for storing a plurality of pieces of predetermined auxiliary cooking time data, and for selecting one of said plurality of pieces of predetermined auxiliary cooking time data in response to the cooking amount signal.

6. An apparatus according to claim 5, wherein said first circuit means includes:

a pulse counter having a clock input terminal and an output terminal;

a first gate circuit, connected to said first controlling means and to said clock input terminal of said pulse counter so as to receive the clock signal, for supplying the clock signal to said pulse counter when the actual kettle temperature is equal to the first reference temperature and for preventing the clock signal from being supplied to said pulse counter when the kettle temperature is subsequently equal to the second reference temperature; and a second gate circuit, connected between the output terminal of said pulse counter and said second circuit means, for transmitting the time interval corresponding to the count result of said pulse counter to said second circuit means when the actual kettle temperature is equal to the second reference temperature.

7. An apparatus according to claim 6, wherein said second circuit means includes:

a plurality of first memories for respectively storing a plurality of pieces of reference time data which are sequentially separated at predetermined intervals; and a plurality of comparators, each having a first input terminal connected to each of said plurality of first memories, a second input terminal connected to said second gate circuit, and an output terminal from which a comparison signal is generated.

8. An apparatus according to claim 7, wherein said third circuit means includes:

a plurality of second memories, each storing said plurality of pieces of auxiliary cooking time data and each having an output terminal from which the selected one of said plurality of pieces of auxiliary cooking time data is generated; and a plurality of third gate circuits, each having an input terminal connected to the output terminal of one of said second memories, a gate terminal connected to the output terminal of one of said comparators, and each of said third gate circuits adapted to be opened and closed in response to the comparison signal and to allow transmission of the selected one of said plurality of pieces of auxiliary cooking time data therethrough, said selected one being stored in each of said second memories connected to each of said third gate circuits.

9. An apparatus according to claim 6, wherein said second circuit means includes:

first, second and third memories for respectively storing first, second and third reference time interval data which sequentially increase at predetermined intervals;

first, second and third comparators respectively having first input terminals connected to said second gate circuit, second input terminals connected to said first, second and third memories, and output terminals, each of said first, second and third comparators producing a signal of a first logic level when input data supplied to said first input terminal exceeds input data supplied to said second input terminal, and, otherwise, producing a signal of a second logic level;

first and second transfer gates respectively connected between said second gate circuit and said first input terminals of said first and second comparators, and having gate terminals, each of said first and second transfer gates being adapted to be opened when the signal of the first logic level is applied to the gate terminal thereof; and first and second inverters connected between the gate terminal of said first transfer gate and the output terminal of said second comparator and between the gate terminal of said second transfer gate and the output terminal of said third comparator, respectively, said first and second inverters inverting output signals from the output terminals of said second and third comparators and to supplying inverted signals to the gate terminals of said first and second transfer gates, respectively;

whereby only one of said first to third comparators produces the signal of the first logic level in accordance with a relationship of a count result of said pulse counter with the second and third reference time data when the count result of said pulse counter exceeds the first reference time interval.

10. An apparatus according to claim 9, wherein said third circuit means includes:

fourth, fifth and sixth memories for respectively storing first, second and third auxiliary cooking time data, said fourth to sixth memories having output terminals from which the first to third auxiliary cooking time data are respectively generated; and third, fourth and fifth transfer gates respectively having input terminals each connected to the output terminals of said fourth to sixth memories, gate terminals each connected to the output terminals of said first to third comparators and output terminals, each of said third to fifth transfer gates being opened when the signal of first logic level is supplied to the gate terminal thereof so as to allow transmission of the auxiliary cooking time data therethrough.

11. An apparatus according to claim 10, wherein said second controlling means includes:
- a second pulse counter for receiving the clock pulse and for measuring the actual time interval of the auxiliary cooking in accordance with the clock signal;
- a seventh memory connected to the outputs of said third to fifth transfer gates, for temporarily storing one of the first to third auxiliary cooking time interval data supplied through one of said third to fifth transfer gates which is opened in response to the signal of first logic level; and
- a fourth comparator connected to said second pulse counter and said seventh memory, for comparing the actual time interval and said one of said first to third auxiliary cooking time interval data.

* * * * *